United States Patent [19]

Carter

[11] Patent Number: 5,061,465

[45] Date of Patent: Oct. 29, 1991

[54] BULK $CO_2$ RECOVERY PROCESS

[75] Inventor: Cecil O. Carter, Wann, Okla.

[73] Assignee: Phillips Petroleum Company, Bartlesville, Okla.

[21] Appl. No.: 397,947

[22] Filed: Aug. 24, 1989

[51] Int. Cl.$^5$ ............................................. B01D 55/14
[52] U.S. Cl. ..................................... 423/229; 423/228
[58] Field of Search ................................. 423/228, 229

[56] References Cited

U.S. PATENT DOCUMENTS

| | | | |
|---|---|---|---|
| 3,237,376 | 3/1966 | Bauer | 55/19 |
| 3,489,506 | 1/1970 | Galstaun et al. | 423/228 |
| 4,094,957 | 6/1978 | Sartori et al. | 423/223 |
| 4,112,051 | 9/1978 | Sartori et al. | 423/223 |
| 4,240,922 | 12/1980 | Sartori et al. | 252/189 |
| 4,252,548 | 2/1981 | Markbreiter et al. | 62/17 |
| 4,397,660 | 8/1983 | Van der Pas-Toornstra | 423/228 |
| 4,466,946 | 8/1984 | Goddin, Jr. et al. | 423/228 |
| 4,624,839 | 11/1986 | Wolcott et al. | 423/228 |
| 4,741,884 | 5/1988 | Carter et al. | 422/171 |

Primary Examiner—Gary P. Straub
Assistant Examiner—Stephen G. Kalinchak
Attorney, Agent, or Firm—George E. Bogatie

[57] ABSTRACT

A high temperature absorption process for bulk recovery of $CO_2$ comprises contacting a gaseous mixture containing $CO_2$, $H_2S$, and natural gas with $C_3$ and heavier components and having a high and variable $CO_2$ loading, with an amine absorbent solution at a temperature above 220° F. The amine absorbent solution is continuously regenerated in a multiple section flashing so as to reduce the energy requirements for regeneration and thereby making the process more suitable for bulk recovery of $CO_2$ from gas streams associated with enhanced oil recovery projects employing $CO_2$ for miscible flood of oil reservoirs.

14 Claims, 2 Drawing Sheets

BULK CO₂ RECOVERY PROCESS

This invention relates to separating carbon dioxide and hydrocarbons in a normally gaseous mixture with high carbon dioxide content. In one aspect it relates to a solvent absorption/desorption method for treating gas with high carbon dioxide content. In another aspect it relates to an improved method for recovering carbon dioxide from natural gas which contains $C_2$ and higher molecular weight hydrocarbons.

BACKGROUND OF THE INVENTION

Interest in the separation and recovery of carbon dioxide from hydrocarbon gas streams containing a large percentage of carbon dioxide comes primarily from recovery of carbon dioxide from gas streams associated with enhanced oil recovery (EOR) projects employing carbon dioxide for miscible flood of oil reservoirs, thereby allowing the recovered carbon dioxide to be reinjected into the oil reservoir.

Several commercial processes i.e. Selexol, Benfield, Catacarb, Ryan/Holmes, etc. are claimed to be suitable for bulk $CO_2$ recovery from hydrocarbon streams. Complications arise in these processes, however, because of solvent contamination with $C_2$ and heavier hydrocarbon components which are present in miscible flood gas, and which cause foaming in the solvent of the absorption system in these processes. Consequently with each of above mentioned commercial processes, there is a disadvantage in processing gas produced from a typical oil reservoir flood which can result in adverse economic factors such as excessive operating cost, royalty payments, initial plant investment, solvent toxicity, etc., that render the process uneconomical for processing miscible flood gas.

Accordingly it is an object of this invention to provide a process for bulk recovery of $CO_2$ from a gaseous mixture.

It is a further object of this invention to provide a process for economically recovering $CO_2$ from normally gaseous mixtures comprising hydrocarbons and $CO_2$.

It is a still further object of this invention to recover a $CO_2$ stream from an EOR project which is substantially free of hydrocarbons so as to be suitable for reinjection into an oil well.

SUMMARY OF THE INVENTION

In accordance with this invention a process for removing an acid gas component from a gaseous mixture containing the acid gas and hydrocarbons which include $C_2$ and heavier hydrocarbons, comprises the steps of:

(a) contacting a feed gas stream comprising a miscible flood gas with an absorbent consisting essentially of an aqueous alkanolamine solution in a contacting zone at conditions wherein the acid gas is absorbed at temperatures ranging from about 220° F. to about 260° F.;

(b) withdrawing a liquid solvent stream enriched in the acid gas from the contacting zone; and (c) withdrawing from the contacting zone a gaseous hydrocarbon stream having a reduced concentration of the acid gas compared to the concentration of acid gas in the feed gas stream.

Further aspects and additional advantages of the invention will be apparent from the following detailed description of the preferred embodiment of the invention as illustrated by the drawings in which:

DETAILED DESCRIPTION OF THE PREFERRED EMBODIMENT

In a solution absorption process for treating a miscible flood gas stream comprising hydrocarbons and $CO_2$ with an alkanolamine solution to absorb the $CO_2$, wherein the hydrocarbons include $C_2$ and heavier hydrocarbons and the flood gas is such that condensation of the heavier hydrocarbons can occur during $CO_2$ removal by solution absorption, I have discovered a process improvement. This improved process achieves greater efficiency for $CO_2$ recovery from miscible flood gas since a reduction of solvent circulation, compared to absorption of $CO_2$ in water, is possible while maintaining recovery of $CO_2$ from the hydrocarbons. As used herein a miscible flood gas is a gas having a high and variable $CO_2$ content and also containing methane, ethane, and possibly $H_2S$ along with a significant amount of $C_2$ and heavier hydrocarbon components.

The improvement is achieved by operating the alkanolamine absorption process step at a temperature higher than heretofore recognized in the prior art, and conducting the regeneration/desorption of the alkanolamine solution at the same temperature as the absorption step. While others have avoided high temperature absorption of acid gases such as $CO_2$ and $H_2S$ with alkanolamine solutions since the effect of temperature on water solubilities of gases generally predicts decreasing solubility with increasing temperature, I have discovered that with suitable pressure, and feed/solvent ratio, a more efficient absorption process can be achieved for a miscible flood gas stream as a result of increasing the absorption/desorption temperature from the normally preferred temperature ranges.

Figure 1:
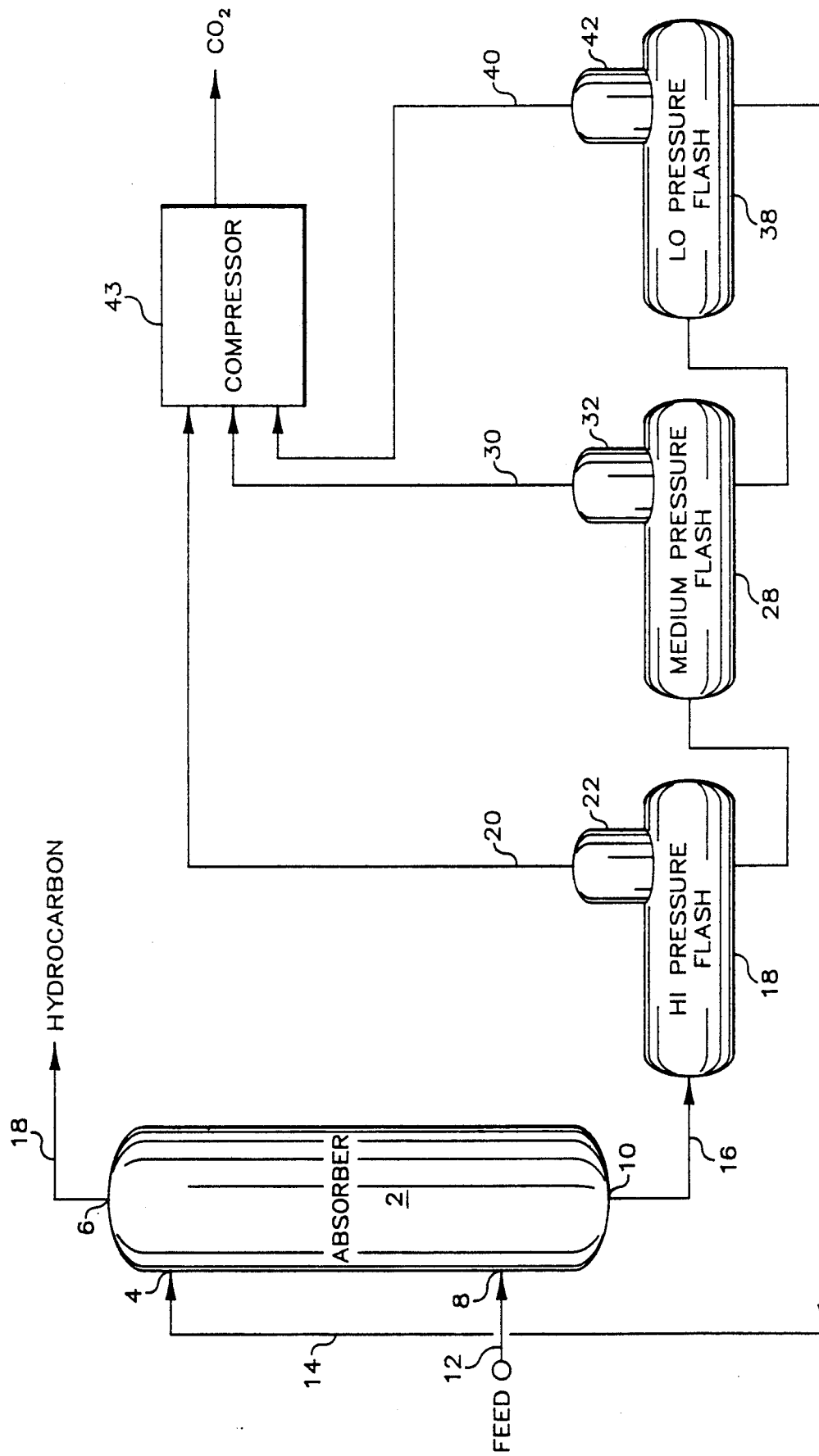
FIG. 1 is a schematic diagram illustrating a simplified process flow of an absorption process.

It will be appreciated by those skilled in the art that, since FIG. 1 is schematic only, many items of equipment which would be needed in a commercial plant for successful operation, have been omitted for the sake of clarity. Such items of equipment would include, for example, temperature, flow and pressure measurement instruments and corresponding process controllers, pumps, compressors, heat exchangers, and valves, etc., all these items would be provided in accordance with standard chemical engineering practice to maintain desired conditions throughout the process and form no part of the present invention.

The present invention is applicable to any alkanolamine absorption process for bulk recovery of acid gases using aqueous alkanolamine solution wherein the acid gas is removed from a gaseous mixture containing a significant concentration of $C_2$ or higher molecular weight hydrocarbons. The commonly used aqueous solutions of alkanolamine solvents, which are suitable for use in the process of the present invention, include MEA(monoethanolamine), DEA(diethanolamine), MDEA(methyldiethanolamine) DGA(diglycolamine) and TEA(triethanolamine). It is particularly applicable to treating miscible flood gas produced from enhanced oil recovery which results in considerable carbon dioxide dilution of the produced gas, with carbon dioxide concentration often in excess of 80%, and with a significant concentration of $C_2$ and higher molecular weight hydrocarbons.

Referring now to FIG. 1, a treating vessel such as an absorber column 2, which defines a contacting zone, has a liquid inlet 4 and a vapor outlet 6 opening into the upper portion of column 2, and a vapor inlet 8 and a liquid outlet 10 opening into the lower portion of the column 2. Column 2 may be any suitable vapor-liquid contacting apparatus. Preferably column 2 is a type of apparatus having a plurality of vapor-liquid contact trays where the feed gas is contacted in countercurrent flow with a liquid solvent selective for acidic gases such as $CO_2$ and $H_2S$ in the feed gas stream under the prevailing conditions of operation.

In operation in accordance with the process flow illustrated in FIG. 1, a feed gas stream comprising natural gas containing at least $CO_2$ and having a significant concentration of $C_2$ and heavier hydrocarbons is supplied to the column 2 via conduit 12 and vapor inlet 8. The feed gas stream could have for its origin, for example, a gas stream produced in a $CO_2$ miscible flooding for enhanced oil recovery, in which case it would contain a high and variable $CO_2$ loading, which could increase from about 19 mole percent to about 85 mole percent, possibly $H_2S$, and natural gas along with a significant concentration of $C_2$ and heavier hydrocarbons. The feed gas stream is introduced into the lower portion of the column 2 via conduit 12 where it is contacted with a suitable liquid absorbent for acid gases, such as a 20 to 60 weight percent methyldiethanolamine (MDEA) solution, supplied to an upper portion of the column 2 via conduit 14 and liquid inlet 4. Under a suitable pressure, e.g. 300 psig, the MDEA solution absorbs the acid gases such as $CO_2$ and $H_2S$ from the rising gas stream by reason of countercurrent contact, and the resulting MDEA stream, rich in acid gases, is removed from the bottom of column 2 via outlet 10 and conduit 16. A purified hydrocarbon gas stream is removed overhead from the column 2 via vapor outlet 6 and conduit 18 and provided to standard gas treater and natural gas liquids (NGL) recovery facilities, not illustrated in FIG. 1. According to a presently preferred embodiment of the invention a mole ratio of feed flow to solvent flow supplied to the absorber 2 is in a range of from about 2.3 to about 5.1 and more preferably in a range of from about 3.0 to about 4.0.

The MDEA containing the absorbed carbon dioxide exiting the bottom of absorber column 2 is preferably regenerated solely by multiple stage flashing. To effect the first stage of flashing $CO_2$ from the liquid stream, the MDEA, rich in $CO_2$ and at a pressure level of about 300 psig and a temperature essentially matching the temperature within column 2, flows through conduit 16 to a high pressure flash vessel 18 where the pressure is typically dropped from about 300 psig to about 107 psig to effect the first stage of flashing $CO_2$ from the liquid stream. The MDEA solution, rich in $CO_2$, enters the flash vessel 18 where at least a portion of the $CO_2$ is vaporized. The vaporized $CO_2$ in flash vessel 28 rises and exits through conduit 20 after passing through a separator section 22 in the flash vessel 18 to disengage any liquid droplets.

The thus flashed stream has a temperature of about 245° F. and is passed from the high pressure flash vessel 18 via conduit 26 to the intermediate pressure flash vessel 28, where the pressure is typically reduced from about 107 psig to about 35 psig to effect the second or intermediate stage of flashing $CO_2$ from the liquid absorbent stream. The vaporized $CO_2$ in flash vessel 28 rises and exits through conduit 30 after passing through a separator section 32 in flash vessel 28 to disengage any liquid droplets.

The thus flashed stream in flash vessel 28 has a temperature of about 240° F. and is passed from the intermediate pressure flash vessel 28 via conduit 36 to the low pressure flash vessel 38, where the pressure is typically reduced from about 35 psig to about 5 psig to effect the third or low pressure stage of flashing $CO_2$ from the liquid stream. The vaporized $CO_2$ in flash vessel 38 rises and exits through conduit 40 after passing through a separator section 42 in flash vessel 38 to disengage any liquid droplets.

As illustrated in FIG. 1, the vaporized $CO_2$ flows from the flash vessels 18, 28, and 38 in parallel arranged conduits 20, 30, and 40 to a compressor 43 for recompression of the $CO_2$ to a pressure, for example about 2000 psig, which is suitable for reinjecting the $CO_2$ into an oil reservoir. The regenerated MDEA solvent is withdrawn from flash vessel 38 and is discharged via conduit 14 into the top of the absorber column 2 through liquid inlet 4 to complete the recycling of the MDEA.

In the presently preferred mode of practicing the invention, the absorption step is conducted by feeding the normally gaseous feed mixture into the base of the absorber column 2 at a pressure of about 300 psig while fresh and/or regenerated absorbing solution, e.g. MDEA, is fed into the top. The normally gaseous feed mixture freed largely from acidic gases is withdrawn from the top of the absorber column. Preferably the temperature of the absorbing solution during the absorption step is in the range of from about 220° F. to about 260° F., and more preferably from about 240° F. to about 260° F. The pressure of the normally gaseous feed mixture supplied to the absorber column 2 will preferably be in the range of from about 1 to about 1000 psig, and more preferably in the range of from about 100 to about 500 psig. The contacting occurs under conditions such that gases, e.g. $CO_2$ possibly in combination with $H_2S$ and $C_2$ and heavier hydrocarbons, are each absorbed to some degree by the absorbing solution.

The liquid absorbent which is at least partially saturated with gases, such as $CO_2$ or $H_2S$, may be regenerated so that it may be recycled back to the absorber. The regeneration or desorption is accomplished at essentially the same temperature as the absorption by conventional means, such as pressure reduction by multiple stage flashing as illustrated in FIG. 1.

EXAMPLE

During operation of a pilot plant unit a gas stream having a composition which might be found in a gas stream produced in a reservoir flood gas operation, was contacted with a 50 wt % solution of MDEA in an absorption column having eight liquid vapor contacting trays. Heat was added to the absorption solution during regeneration to compensate for heat losses (which occurred elsewhere in the system), so as to achieve adiabatic conditions. It was observed that excess heat inadvertently added to the absorption solution during regeneration resulted in improved removal of $CO_2$ from the feed gas.

The process flow of the pilot plant is illustrated in FIG. 1. The $CO_2$ rich feed mixture was compressed and charged to the absorber column where it was contacted with MDEA under about 300 psig pressure in the absorber and with a feed gas to MDEA absorbent solution mole ratio of about 3.6. The rich absorption solution was regenerated in three stage flashing where liquid from the absorber was serially routed through a high pressure flash (HPF), a medium pressure flash (MPF), and a low pressure flash (LPF). The thus regenerated MDEA solution was recycled to the absorber column.

Table 1 below presents actual pilot plant data for temperatures and compositions for the absorption process flow corresponding to FIG. 1. This data illustrates that excess heat was added to the flash system. This is indicated by noting that in several of the runs the second stage flash temperature (MPF) is higher than the first stage flash temperature (HPF). This temperature variation is contrary to an adiabatic flash system where the temperature would decrease from the absorber through each of the flash stages.

Figure 2:
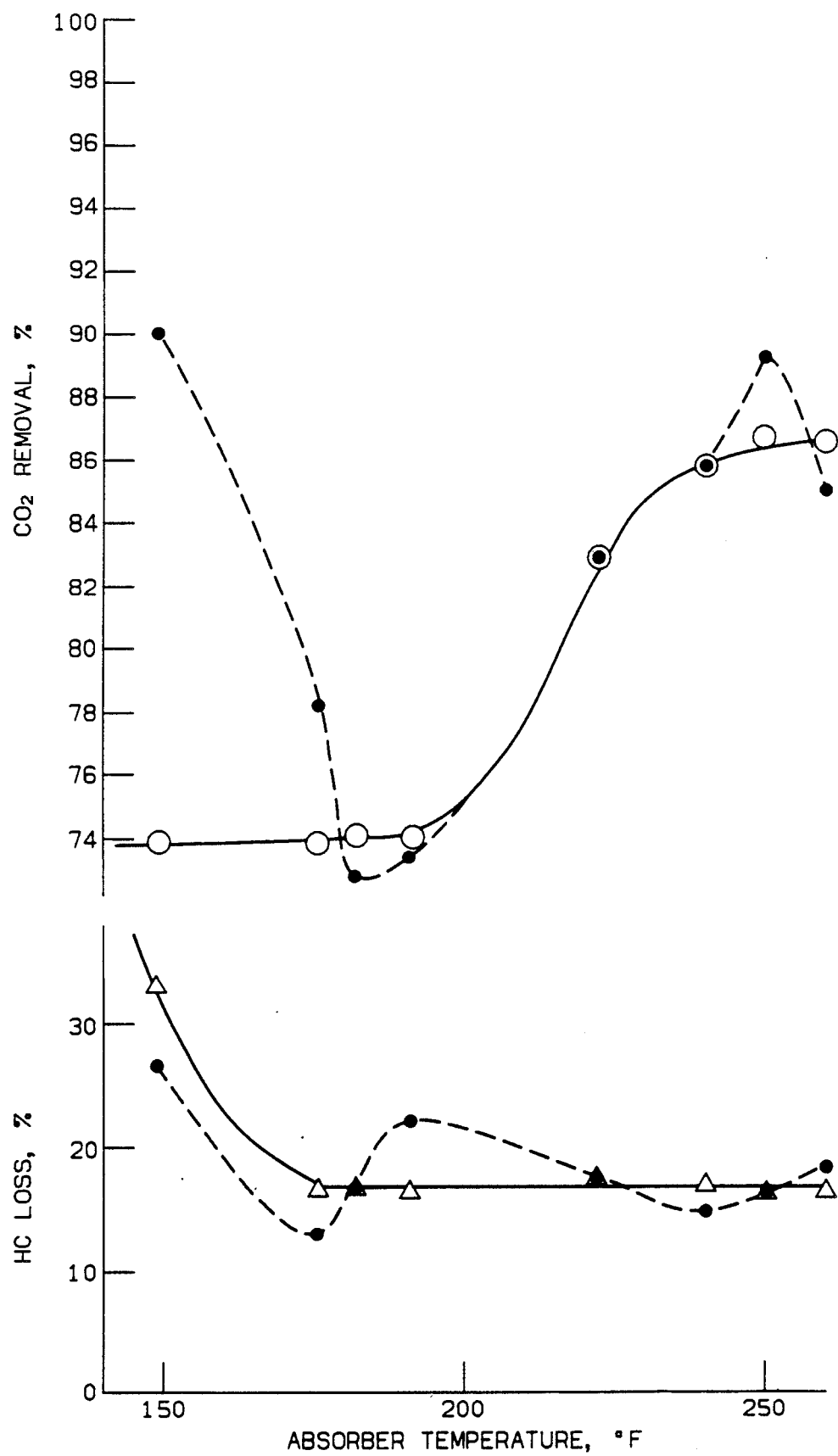
FIG. 2 graphically illustrates carbon dioxide removal versus temperature and hydrocarbon loss versus temperature of an absorption process according to the invention.

FIG. 2 graphically illustrates, in the dashed line curve, the data of Table 1 showing $CO_2$ removal and loss of hydrocarbon in the rich MDEA solution, as a function of absorber temperature. Also illustrated in the solid line curve in FIG. 2, is a computer enhanced curve based on the data of Table 1. It is noted that the actual data point for $CO_2$ removal at 149° F. was discarded with respect to providing the computer enhanced curve, as being statistically insignificant compared to the majority of the data points.

TABLE 1

| Temperatures-°F. | | | | $CO_2$ Composition % | | | H/C |
|---|---|---|---|---|---|---|---|
| ABS | HPF | MPF | LPF | Feed | ABS, O/H | Remov. | Loss % |
| 149 | 146 | 161 | 135 | 91 | 53 | 90 | 27 |
| 176 | 164 | 153 | 128 | 85 | 49 | 78 | 13 |
| 182 | 171 | 161 | 135 | 91 | 63 | 73 | 17 |
| 191 | 179 | 164 | 135 | 87 | 63 | 73 | 22 |
| 222 | 202 | 217 | 208 | 87 | 63 | 83 | 17 |
| 240 | 220 | 220 | 209 | 88 | 51 | 86 | 14 |
| 250 | 232 | 225 | 215 | 87 | 44 | 89 | 16 |
| 260 | 241 | 234 | 226 | 87 | 55 | 85 | 17 |

Table 2 below presents actual pilot plant data for mole ratio, temperature and compositions for the absorption process flow corresponding to FIG. 1. This data illustrates the effect of feed/solvent ratio on $CO_2$ removal and loss of hydrocarbons in the rich MDEA solution, for bulk removal of $CO_2$ from a miscible flood gas stream. The data, which was obtained at a absorber temperature of 257° F., indicates, for example, that the $CO_2$ concentration of the treated gas was reduced from 86% to 3.2% at a feed/solvent mole ratio of 3.17.

TABLE 2

| Mole Ratio | Temp. °F. | $CO_2$ Composition % | | | H/C |
|---|---|---|---|---|---|
| Feed/Solvent | ABS | Feed | ABS, O/H | Remov. | Loss % |
| 1.94 | 261 | 86 | 2.0 | 99.6 | 28.6 |
| 2.29 | 258 | 86 | 3.2 | 99.2 | 10.7 |
| 2.52 | 255 | 86 | 3.4 | 99.3 | 33.0 |
| 2.80 | 257 | 87 | 3.1 | 99.3 | 16.2 |
| 3.17 | 257 | 86 | 3.2 | 99 | 9.5 |
| 3.63 | 256 | 88 | 51 | 87 | 17.3 |

The invention has been described in terms of the presently preferred embodiment wherein bulk recovery of $CO_2$ by high temperature absorption is achieved. The $CO_2$ is absorbed from a gas stream having a composition which might be found in a gas stream produced in an EOR operation using $CO_2$ for miscible flooding of oil reservoirs. It is to be understood, however, that reasonable variations and modifications are possible by those skilled in the art, and such modifications and variations are within the scope of the described invention and the appended claims.

That which is claimed is:

1. A process for removing an acid gas component from a gaseous mixture containing said acid gas and hydrocarbons comprising methane, ethane and heavier hydrocarbons, said process comprising the steps of:
    (a) contacting a feed gas stream comprising said gaseous mixture with an absorbent consisting essentially of an aqueous alkanolamine solution in a contacting zone wherein said acid gas component is absorbed by said absorbent at a temperature in the range of from about 240° F. to about 260° F.;
    (b) withdrawing a liquid stream enriched in said acid gas component from said contacting zone; and
    (c) withdrawing from said contacting zone a gaseous hydrocarbon stream having a reduced concentration of said acid gas component compared to the concentration of said acid gas component in said feed gas stream.

2. A process in accordance with claim 1 wherein said liquid stream withdrawn in step (b) is regenerated at essentially the same temperature as the absorption in step (a) and recycled to said contacting zone.

3. A process in accordance with claim 1 wherein said acid gas component is carbon dioxide and said aqueous alkanolamine solution consists essentially of an aqueous methyldiethanolamine solution.

4. A process in accordance with claim 3 wherein said methlydiethanolamine solution contains from about 20 to about 60 weight percent of methyldiethanolamine.

5. A process in accordance with claim 4 wherein conditions in said contacting zone include a pressure within the range of from about 100 psig to about 400 psig.

6. A process in accordance with claim 5 wherein the molar ratio of feed gas to alkanolamine solution within said contacting zone is in the range of from about 2.3 to about 5.1.

7. A process in accordance with claim 3 wherein the carbon dioxide content of said feed gas is in the range of from about 19 mole percent to about 85 mole percent.

8. A process in accordance with claim 1 wherein said aqueous alkanolamine solution is selected from the group of aqueous solution consisting of MEA, DEA, MDA, DGA, TEA, and combinations of any two or more thereof.

9. A process for removing carbon dioxide from a gaseous mixture containing carbon dioxide and hydrocarbons comprising methane, ethane and which includes $C_3$ and heavier hydrocarbons, said method comprising the steps of:
    (a) contacting a feed gas stream comprising said gaseous mixture with an absorbent consisting essentially of an aqueous methyldiethanolamine (MDEA) solution in a contacting zone and at a contacting temperature wherein said carbon dioxide is absorbed in said absorbent solution at a temperature in the range of from about 240° F. to about 260° F.;
    (b) withdrawing a liquid MDEA stream enriched in carbon dioxide from said contacting zone;
    (c) passing the thus withdrawn liquid MDEA stream through a first pressure reducing vessel at a temperature substantially matching the contacting temperature in said contacting zone to effect a first flashing separation of absorbed $CO_2$ from said liquid MDEA stream;

(d) withdrawing a liquid MDEA stream enriched in carbon dioxide from said first pressure reducing zone and passing the thus withdrawn liquid MDEA stream to a second pressure reducing zone;

(e) effecting a second flashing separation of absorbed $CO_2$ from said liquid MDEA stream in said second pressure reducing vessel;

(f) withdrawing a liquid MDEA stream enriched in carbon dioxide from said second pressure reducing vessel and passing the thus withdrawn liquid stream to a third pressure reducing vessel;

(g) effecting a third flashing separation of absorbed $CO_2$ from said liquid MDEA stream at a temperature substantially matching the contacting temperature in said contacting zone in said third pressure reducing vessel so as to produce regenerated liquid MDEA and gaseous carbon dioxide;

(i) withdrawing a regenerated liquid MDEA stream from said third pressure reducing vessel and passing the thus withdrawn regenerated liquid MDEA stream to said contacting zone to effect said contacting step in paragraph (a); and (j) withdrawing from said contacting zone a gaseous hydrocarbon stream having a reduced concentration of $CO_2$ compared to the concentration of $CO_2$ in said feed gas stream.

10. A process in accordance with claim 9 additionally comprising the step of:

passing gaseous $CO_2$ from said first, second, and third pressure reducing vessels to a compressor.

11. A process in accordance with claim 9 wherein said liquid methyldiethanolamine (MDEA) absorbent solution consists essentially of from about 20 to about 60 weight percent solution of methyldiethanolamine.

12. A process in accordance with claim 9 wherein conditions in said contacting zone include a pressure within the range of from about 100 to about 400 psig.

13. A process in accordance with claim 12 wherein the molar ratio of feed gas to absorbent solution within said contacting zone is in the range of from about 2.3 to about 5.1.

14. A process in accordance with claim 13 wherein the $CO_2$ content of said feed gas is in the range of from about 19 mole percent to about 85 mole percent.

* * * * *